United States Patent
Bouchier et al.

(10) Patent No.: US 6,839,771 B1
(45) Date of Patent: Jan. 4, 2005

(54) METHOD AND SYSTEM FOR USING A UNIVERSAL SERIAL BUS (USB) AS A PEER-TO-PEER NETWORK

(75) Inventors: Paul H. Bouchier, Little Elm, TX (US); Ronald E. Gilbert, Jr., Plano, TX (US); Christine Koerber, Dallas, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 09/549,124

(22) Filed: Apr. 13, 2000

(51) Int. Cl.[7] .................. G06F 15/16; G06F 15/173; G06F 13/20
(52) U.S. Cl. .................. 709/253; 709/238; 710/313
(58) Field of Search .................. 709/238, 253, 709/212; 710/313, 314, 308, 311, 316

(56) References Cited

U.S. PATENT DOCUMENTS

| | | | | |
|---|---|---|---|---|
| 5,854,910 A | * | 12/1998 | Gulick ............... | 710/312 |
| 5,913,045 A | * | 6/1999 | Gillespie et al. ....... | 710/311 |
| 5,958,027 A | * | 9/1999 | Gulick ............... | 710/300 |
| 6,061,794 A | * | 5/2000 | Angelo et al. ........ | 713/200 |
| 6,219,736 B1 | * | 4/2001 | Klingman ............. | 710/315 |
| 6,233,640 B1 | * | 5/2001 | Luke et al. ........... | 710/315 |
| 6,237,057 B1 | * | 5/2001 | Neal et al. ........... | 710/309 |
| 6,434,643 B1 | * | 8/2002 | Ejiri ................. | 710/58 |
| 6,499,079 B1 | * | 12/2002 | Gulick ............... | 710/305 |
| 6,529,963 B1 | * | 3/2003 | Fredin et al. ......... | 710/1 |
| 6,594,771 B1 | * | 7/2003 | Koerber et al. ........ | 713/330 |
| 6,618,788 B1 | * | 9/2003 | Jacobs ............... | 710/315 |
| 6,725,281 B1 | * | 4/2004 | Zintel et al. .......... | 719/318 |
| 6,732,218 B2 | * | 5/2004 | Overtoom et al. ...... | 710/313 |

OTHER PUBLICATIONS

Severance, C., "Firewire finally comes home", Computer, vol. 31, iss. 11, pp. 117–118, Nov. 1998.*
Chung–Ping, Young et al., "Universal serial bus enhances virtual instrument–based distributed power monitoring", IEEE Trans. on Instumentation and Measurement, vol. 50, iss. 6, pp. 1692–1697, Dec. 2001.*
Nathan, D. et al., "Design and features of an intelligent PC–based DAB receiver", IEEE Trans. on Consumer Electronics, vol. 48, iss. 2, pp. 322–328, May 2002.*

* cited by examiner

*Primary Examiner*—Jason D. Cardone

(57) ABSTRACT

In one embodiment, the system includes a host processor and a plurality of devices connected to the host processor via a USB interface. Each of the devices includes at least a processor and USB controller hardware. The host processor includes message handling logic and each of the devices also include message handling logic that is configured to cooperate with the device to prepend a communication protocol header to a message that one of the devices desires to send to the host or to another of the devices. The host processor and each of the devices are peers with respect to each other. A router located in the host processor analyzes the communication protocol header to determine whether the message is destined for the host processor or for one of the other devices.

21 Claims, 6 Drawing Sheets

METHOD AND SYSTEM FOR USING A UNIVERSAL SERIAL BUS (USB) AS A PEER-TO-PEER NETWORK

TECHNICAL FIELD

The present invention relates generally to computer networking, and, more particularly, to a method and system for using a universal serial bus as a peer-to-peer network.

BACKGROUND OF THE INVENTION

A peer-to-peer network is defined as a plurality of computers connected by an electronic network in such a way that each computer can both initiate message transmissions to any other computer on the network, and receive message transmissions from any other computer on the network. A local area network (LAN) is an example of a peer-to-peer network.

The universal serial bus (USB) is a communication bus architecture associated with computing devices that generally allows host-to-device communication through the exchange of packets, or messages. The USB messages typically include header information and data. For example, in the context of a personal computer, the computer processor could be considered the host, and the mouse, keyboard, printer, joystick, disk drives, etc. could be considered the devices that communicate with the host. The conventional USB protocol specifies that all communication messages be transferred between the USB host and the devices attached to the host. The USB architecture is economical to employ due to the availability of competitively priced microprocessors that include an integrated USB device interface.

The conventional USB protocol is also useful for communication in which large bandwidth and the ability to "hotswap" processor modules is important. The term "hotswap" refers to the situation in which a USB device is removed from an operating computer system and replaced with another processor without removing power from the system.

Unfortunately, this conventional protocol, by requiring that all communication between devices connected to the USB occur between the host and each device, prevents device-to-device, also referred to as "peer-to-peer" communication.

Therefore, a need exists for a high bandwidth communication protocol and bus that allows the removal and replacement of processor modules without removing power from the system and that allows peer-to-peer communication between devices connected to a communication bus.

SUMMARY OF THE INVENTION

The invention provides a method and system for peer-to-peer communication between devices connected to a USB.

The invention may be conceptualized as a method for using a USB as a peer-to-peer network, the method comprising the steps of: connecting a host processor to a USB, the host processor including a router, and connecting a plurality of devices to the USB, each of the devices being peers with respect to each other and with respect to the host processor. The method also includes the steps of forming a message in one of the plurality of devices or the host processor, prepending a header to the message, and transporting the message from one of the devices directly to any other of the devices or the host processor through the router and over the USB.

In architecture, the invention is a system for using a USB as a peer-to-peer network, comprising: a host processor including a message handler. The host processor is configured to prepend a header to a message and the host message handler is configured to recognize the header. The system also includes a plurality of devices associated with the host processor, each of the devices including a device message handler. Each of the plurality of devices is configured to prepend the header to the message. The device message handler is also configured to recognize the header. The system also includes a router associated with the host processor, the router configured to route the message over a USB directly between the host processor and any of a plurality of the devices associated with the host processor.

BRIEF DESCRIPTION OF THE DRAWINGS

The present invention, as defined in the claims, can be better understood with reference to the following drawings. The components within the drawings are not necessarily to scale relative to each other, emphasis instead being placed upon clearly illustrating the principles of the present invention.

DETAILED DESCRIPTION OF THE PREFERRED EMBODIMENT

Although the preferred embodiment of the method and system for using the USB as a peer-to-peer network will be described in the context of a number of microprocessor driven devices interacting with each other using a USB for the purpose of controlling a server computer system, the invention is applicable in any situation in which a number of devices communicate over a USB.

The method and system for using the USB as a peer-to-peer network can be implemented in hardware, software, firmware, or a combination thereof. In the preferred embodiment(s), the invention is implemented in a combination of hardware and software or firmware. The hardware or firmware can be stored in a memory and be executed by a suitable instruction execution system. If implemented in hardware, as in an alternative embodiment, the invention can be implemented with any or a combination of the following technologies, which are all well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

The software portion of the method and system for using the USB as a peer-to-peer network, which comprises an ordered listing of executable instructions for implementing logical functions, can be embodied in any computer-readable medium for use by or in connection with an instruction execution system, apparatus, or device, such as a computer-based system, processor-containing system, or other system that can fetch the instructions from the medium and execute the instructions. In the context of this document, a "computer-readable medium" can be any means that can contain, store, communicate, propagate, or transport the program for use by or in connection with the instruction execution system, apparatus, or device. The computer readable medium can be, for example but not limited to, an electronic, magnetic, optical, electromagnetic, infrared, or semiconductor system, apparatus, device, or propagation medium. More specific examples (a nonexhaustive list) of the computer-readable medium would include the following: an electrical connection (electronic) having one or more wires, a portable computer diskette (magnetic), a random access memory (RAM) (electronic), a read-only memory (ROM) (electronic), an erasable programmable read-only memory (EPROM or Flash memory) (electronic), an optical fiber (optical), and a portable compact disc read-only memory (CDROM) (optical). Note that the computer-readable medium could even be paper or another suitable medium upon which the program is printed, as the program can be electronically captured, via for instance optical scanning of the paper or other medium, then compiled, interpreted or otherwise processed in a suitable manner if necessary, and then stored in a computer memory.

Figure 1:
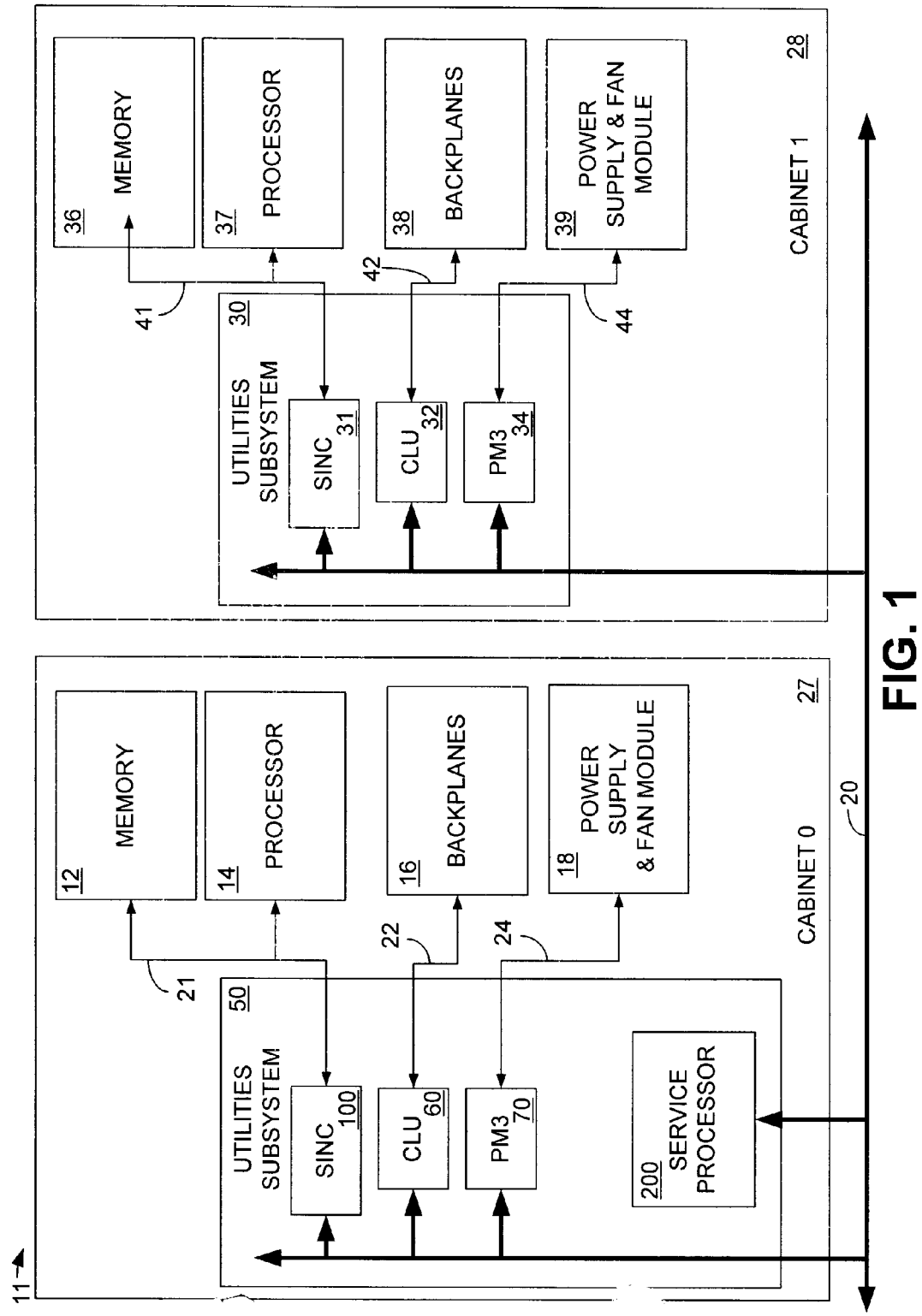
FIG. 1 is a block diagram illustrating a server system, which is used to illustrate the concept of the invention.

Turning now to the drawings, FIG. 1 is a block diagram illustrating a server system 11, which will be used to illustrate the concept of the invention. It should be noted that although shown as a server system 11, the method and system for using the USB as a peer-to-peer network is applicable to any system in which a number of processor devices, each having a USB interface, communicate over the USB in a peer-to-peer arrangement. Server system 11 can be divided into a number of cabinets. For example, for illustration purposes server 11 is divided into nodes, sometimes referred to as cabinets 27 and 28. Cabinet 27 includes memory element 12 and processor 14. Cabinet 28 includes memory element 36 and processor 37. Each cabinet 27 and 28 also includes a utilities subsystem 50 and 30, respectively, which controls and monitors memory elements 12 and 36 and processors 14 and 37, respectively.

Utilities subsystem 50 includes a number of processor devices connected to and in communication via USB 20 and is illustrated herein as including cabinet level utilities (CLU) device 60, power monitor 3 (PM3) device 70, system abstraction layer interface network controller (SINC) device 100 and service processor 200. Multiple utilities subsystems 50 and 30 are illustrated because in a typical application, each utilities subsystem 50 and 30 includes many iterations of the CLU device, PM3 device and the SINC device, and also includes additional processor and control devices. However, for simplicity, only two iterations of the utilities subsystem, each having one iteration of the CLU device, the PM3 device, the SINC device and, in the case of utilities subsystem 50, the service processor 200 are shown. Note, however, that only one service processor 200 (located in utilities subsystem 50) is associated with server 11. In accordance with an aspect of the invention, service processor 200 acts as a host processor. Because the USB protocol allows only one host, no matter the number of utilities processors and associated devices, there is only one service processor 200. Importantly, and in accordance with an aspect of the invention, each of the devices within each utilities subsystem 50 and 30 communicates via USB 20.

SINC device 100 communicates with and controls memory 12 and processor 14 via connection 21. CLU device 60 communicates with and controls backplane element 16 via connection 22 and PM3 device 70 communicates with and controls power supply and fan module 18 via connection 24. Similarly, SINC device 31 communicates with and controls memory 36 and processor 37 via connection 41. CLU device 32 communicates with and controls backplane element 38 via connection 42 and PM3 device 34 communicates with and controls power supply and fan module 39 via connection 44.

Figure 2:
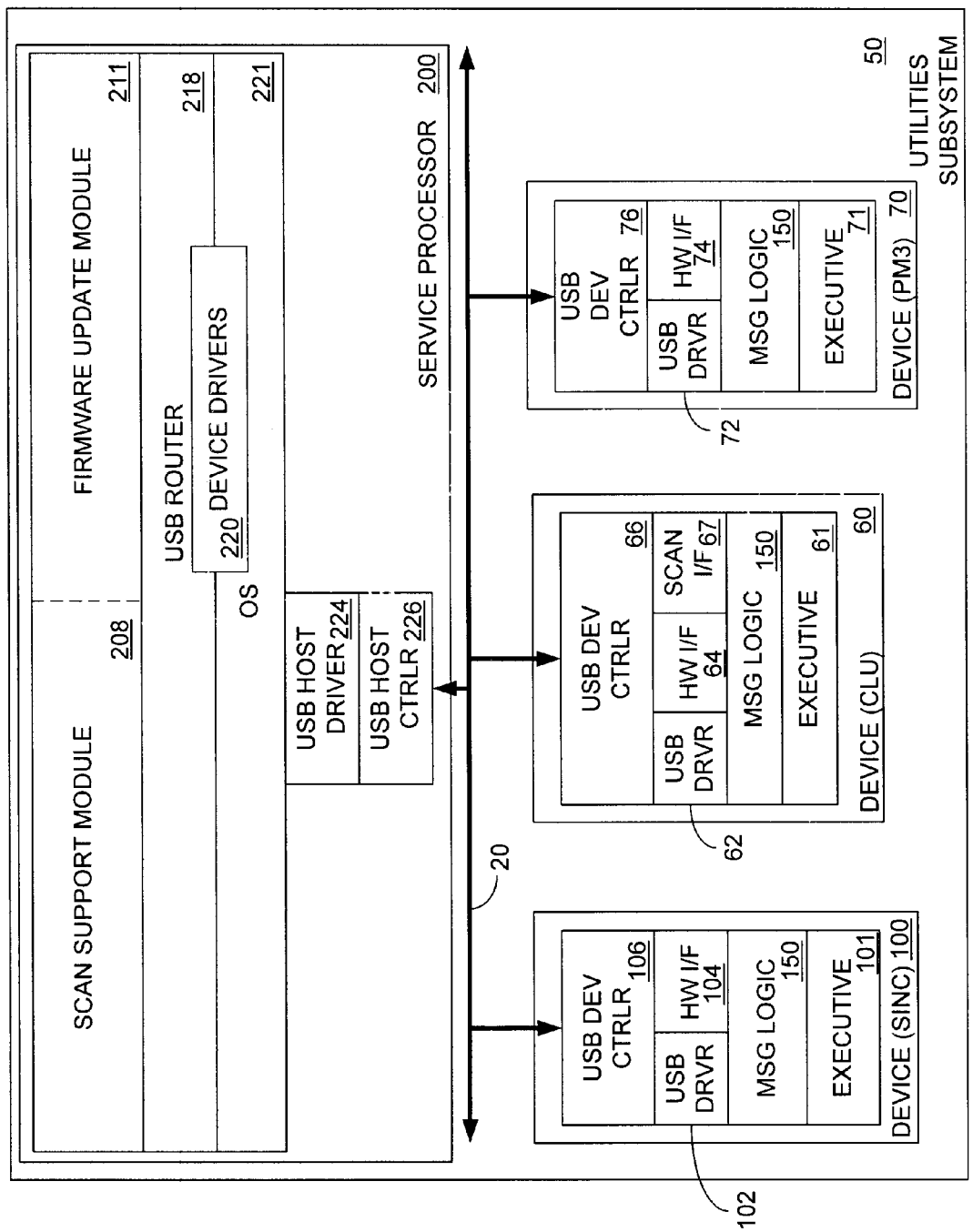
FIG. 2 is a block diagram illustrating the utilities subsystem of FIG. 1.

FIG. 2 is a block diagram illustrating the utilities subsystem 50 of FIG. 1. Utilities subsystem 50 includes service processor 200, which communicates via USB 20 with SINC device 100, CLU device 60 and PM3 device 70. Service processor 200 comprises both hardware and software elements operating in cooperation to control the operation of utilities subsystem 50. Service processor 200 communicates via USB 20 using USB host controller 226 and USB host driver 224. USB host controller 226 is a hardware element (a USB controller chip) and USB host driver 224 is a corresponding software driver used to control the USB communication.

Service processor 200 also includes operating system 221, which is the software element that controls the operation of service processor 200. Service processor 200 also includes USB router 218. USB router 218 communicates with operating system 221 via device drivers 220, which will be explained in further detail below, and which provide the logical connection between the service processor 200 and each of the devices 60, 70 and 100 within utilities subsystem 50.

Service processor 200 also includes a number of software modules that provide various functionality to server system 11. For example, service processor 200 includes scan support module 208 and firmware update module 211, as well as other modules that are part of the overall design of the server system 11 and which rely on communication with other USB-connected microprocessors. Essentially, service processor 200 provides a variety of control functions within utilities subsystem 50 that allow server system 11 to properly function.

Still referring to FIG. 2, utilities subsystem 50 further includes SINC device 100, CLU device 60 and PM3 device 70. Each of these devices is considered a peer with respect to each other. Similarly, the service processor is also a peer with respect to each of the devices 60, 70 and 100. For example, and in accordance with the invention to be described in detail below, each device (SINC 100, CLU 60 and PM3 70) can bi-directionally communicate with each other and with service processor 200 by using the USB 20 as a peer-to-peer network. In this example, the USB could be considered a LAN.

In accordance with an aspect of the invention, message logic 150 contained within SINC device 100, CLU device 60 and PM3 device 70 cooperates with the device to allow each device to prepend a unique communication protocol header to a block of data, thereby forming a communication message that is uniquely addressed to another device connected on the USB. The unique communication protocol header and the data (i.e., the communication message) are then encapsulated by a standard USB header and trailer and forwarded over the USB. The unique communication protocol header allows each device to communicate with each other device as if each device were connected to a peer-to-peer network.

SINC device 100 includes executive 101, message logic 150, USB driver 102, hardware interface 104 and USB device controller 106. USB device controller 106 is a hardware element that comprises a USB device interface chip and interfaces with USB driver 102 in order to communicate messages via USB 20. Hardware interface 104 allows the executive 101 to communicate with other hardware elements (not shown) present on the SINC device 100. Message logic 150 (to be described below in further detail), in cooperation with executive 101, allows SINC device 100 to send a message to any other device connected to USB 20 by creating and prepending the above-mentioned unique communication protocol header to the data that the device wishes to send.

When used conventionally, the USB is useful only for communicating messages between a host and individual remotely connected devices. For example, in a personal computer (PC) environment, the USB is used to communicate messages between the processor and remotely connected peripheral devices such as a printer, a mouse and a keyboard. For example, there was no way (and no reason) for the mouse to communicate with the printer. In previous applications, the USB only allowed host-to-device communication.

In accordance with an aspect of the invention, the message logic 150, in cooperation with USB router 218, analyzes the unique communication protocol header and allows peer-to-peer communication between any devices connected to the USB 20, thereby allowing the USB 20 to function as a peer-to-peer network.

CLU device 60 includes executive 61, message logic 150, USB driver 62, hardware interface 64, scan interface 67 and USB device controller 66. Similarly, PM3 device 70 includes executive 71, message logic 150, USB driver 72, hardware interface 74 and USB device controller 76. The executives 61 and 71, USB drivers 62 and 72, hardware interfaces 64 and 74, and USB device controllers 66 and 76 all operate in similar fashion to their respective devices in SINC device 100.

Although omitted from FIG. 2 for simplicity, the service processor 200, SINC device 100, CLU device 60 and PM3 device 70 each include the processors, memory (including random access memory (RAM) and read-only memory (ROM)), interfaces and connections necessary to execute the software portions of the invention.

PROTOCOL STACK VIEW OF INVENTION

Figure 3:
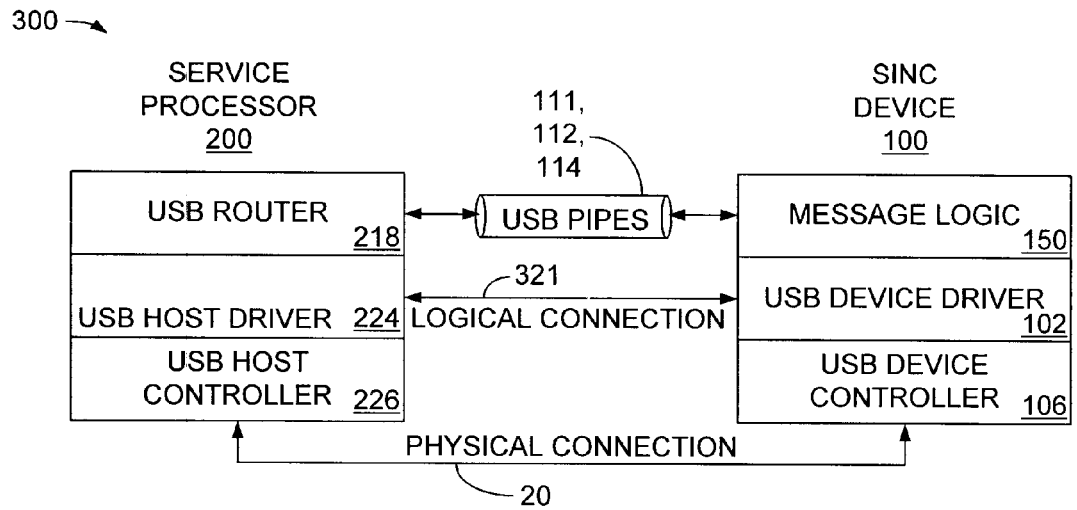
FIG. 3 is a schematic view illustrating a protocol stack 300 according to one aspect of the invention.

FIG. 3 is a schematic view illustrating a protocol stack 300 according to one aspect of the invention. Service processor 200 includes USB host controller 226, USB host driver 224 and USB router 218.

SINC device 100 includes USB device controller 106, USB device driver 102 and message logic 150. As shown in FIG. 3, USB host controller 226 communicates with USB device controller 106 via physical connection (USB) 20. USB host driver 224 communicates logically with USB device driver 102 via logical connection 321. USB router 218 communicates logically with message logic 150 via pipes 111, 112 and 114 using the communication protocol associated with the invention.

Figure 4:
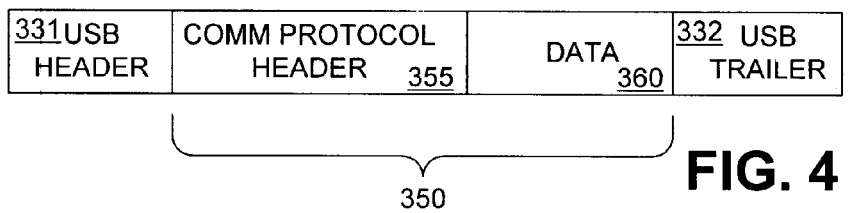
FIG. 4 is a schematic view illustrating the message format in accordance with the invention.

FIG. 4 is a schematic view illustrating the message format 330 in accordance with the invention. Message format 330 includes USB header 331, communication protocol header 355, data 360 and USB trailer 332. In accordance with an aspect of the invention, communication protocol header 355, to be described in greater detail below, is prepended (attached before) to data 360 by any of the devices, for example, SINC device 100, CLU device 60, PM3 device 70 and service processor 200 described above, resulting in a communication message 350. A standard USB header 331 and trailer 332 encapsulate the communication message 350. In this manner, any of the individual devices connected to the USB 20 can send a uniquely identified message to any other of the devices connected to the USB 20.

SYSTEM OPERATION

Figure 5:
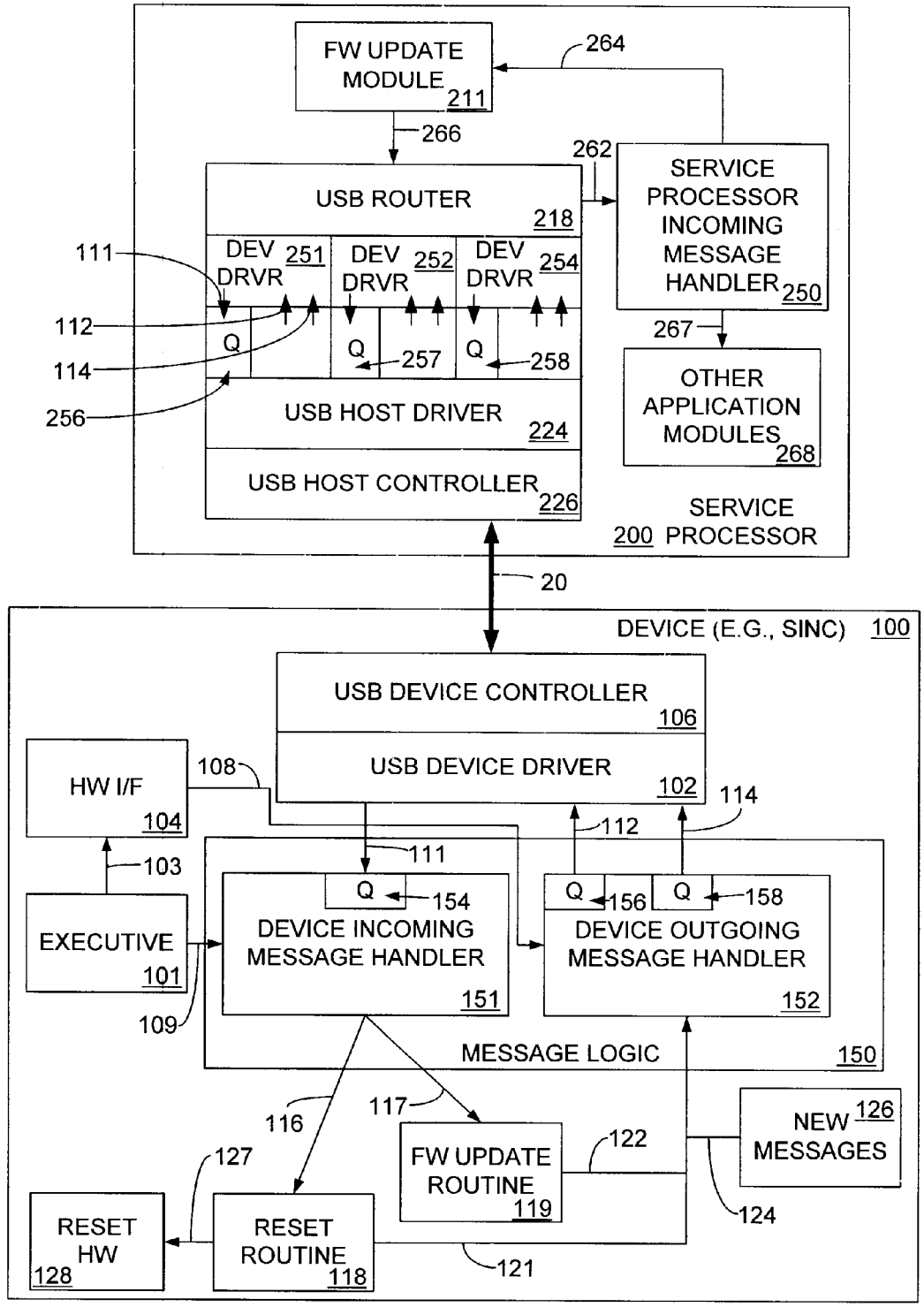
FIG. 5 is a block diagram illustrating the connectivity between service processor and the system abstraction layer interface network controller (SINC) device of FIG. 2.

FIG. 5 is a block diagram illustrating the connectivity between service processor 200 and SINC device 100 of FIG. 2. Although FIG. 5 illustrates only one device (i.e., SINC device 100) connected via USB 20 to service processor 200, it is contemplated that many such devices are connected to service processor 200. To illustrate the operation of the invention, and by way of example, firmware update module 211 (although any module in FIG. 2 can also send a message), sends a communication message to USB router 218 via connection 266. The message sent via connection 266 includes communication protocol header 355 and data 360, which message is received by the USB router 218. The communication protocol header 355 and the data 360 will be described in further detail below with respect to FIG. 7. The USB router 218 inspects the message received via connection 266 and, by analyzing the communication protocol header 355 appended thereto, decides where to send the message. For example, the message from the firmware update module 211 could be destined to any other device connected to the USB, such as for example but not limited to the SINC 100, CLU 60 and PM3 70. The USB router 218 is connected to a plurality of device drivers 251, 252 and 254. Device driver 251 is associated with SINC device 100. Device driver 252 is associated with CLU device 60 and device driver 254 is associated with PM3 device 70. Provision of a device driver for each device type allows for prioritization between messages going to different device types. However, a single device driver could service all device types. The preferred implementation includes one device driver in the service processor 200 associated with each connected device type (i.e., SINC device 100, CLU device 60 and PM3 device 70). These device drivers 251, 252 and 254 are shown by way of example only.

Depending on the destination of the message received via connection 266, the USB router 218 will provide that message to the appropriate device driver 251, 252 or 254, if the message is destined for the SINC device 100, CLU device 60 or the PM3 device 70, or to another entity on the service processor 200 if addressed thereto. By way of example, FIG. 5 includes SINC device 100, which for example purposes only, will be assumed to be the device to which the message received via connection 266 is addressed. USB router 218 recognizes that the message received via connection 266 is destined for SINC device 100 and provides it to device driver 251. When a message is received in service processor 200 from the SINC device 100, that message would also appear in device driver 251. In such a case, that received message is forwarded to USB router 218, which, in accordance with an aspect of the invention, analyzes the communication protocol header prepended to that message and determines where to send that message. For example, if the SINC device 100 sent a message to the CLU device 60, the message would appear at device driver 251 and would be forwarded to the USB router 218, which would then provide the message to device driver 252, associated with CLU device 60. If the message received from the SINC 100 was destined for the service processor 200, then the USB router 218 would accept the received message from device driver 251 and forward it, via connection 262, to service processor incoming message handler 250. Service processor incoming message handler 250 would remove the communication protocol header 355 and forward the data 360 to the appropriate module, in this example, the firmware update module 211 via connection 264. Alternatively, the service processor incoming message handler 250 will forward the data 360 via connection 267 to any other appropriate application module, represented as other application modules 268.

Returning again to the discussion of the message being sent from firmware update module 211 to the SINC device 100, USB router 218 places the message in device driver 251, which then queues the message in queue 256. Device drivers 251, 252 and 254 of FIG. 5 illustrate and correspond to device drivers 220 of FIG. 2. The example given for illustrative purposes assumes that there is a single device of each described type (SINC, PM3 and CLU). In practice, there would be multiples of each device type. Each instance of a given device type has its own queue within the device driver for that device type. Therefore, a device driver could handle a plurality of its device type by handling a plurality of queue-sets, each queue-set corresponding to a particular instance of the corresponding device type.

In accordance with the invention, a logical connection is established between service processor 200 and a remotely connected device, such as SINC device 100. Arrows 111, 112 and 114, which are shown both in service processor 200 and in SINC device 100, illustrate the concept of "pipes", which represent the logical connection that exists between service processor 200 and SINC device 100. Arrow 111 represents the bulk-out pipe, arrow 112 represents the interrupt-in pipe, and arrow 114 represents the bulk-in pipe. The concept of pipes is well known in the art of USB bus communications systems and corresponds to the concept of connected sockets in a transmission control protocol/Internet protocol (TCP/IP) network stack.

INCOMING MESSAGE OPERATION EXAMPLE

In accordance with an aspect of the invention, the USB host controller 226 and service processor 200 periodically poll, via the USB device controller 106 within SINC device 100, the interrupt-in pipe 112. If the SINC device 100 has data it wishes to send either to the service processor 200 or to another device connected to the USB 20, the communication protocol header 355 that was prepended to the data 360 by the device is placed in queue 156. Queue 156 resides within device outgoing message handler 152, which places the communication protocol header 355 on the interrupt-in pipe 112. When the USB host controller 226 polls the interrupt-in pipe 112, it recognizes the presence of the communication protocol header 355 on the interrupt-in pipe and is thereby alerted that the SINC device 100 has information it wishes to send. The communication protocol header 355 will then be forwarded from the device outgoing message handler 152 through the interrupt-in pipe 112 to SINC device driver 251. In USB industry standard terminology, the communication protocol header 355 is called an interrupt data packet.

The SINC device driver 251 will read the length of the communication protocol header 355 plus data field 360 by reading the length field of the header 355 (bytes 6 & 7 to be described below in FIG. 7). The SINC device driver 251 will determine whether there is any more data that the SINC device 100 has to send. This is accomplished by analyzing particular fields within the communication protocol header 355, which will be described in detail below with respect to FIG. 7. If the SINC device driver 251 determines that the SINC device 100 has more information to send, the SINC device driver 251 will send a "USB bulk read" command to the SINC device 100. This results in the balance of the communication message (i.e., the data 360) being forwarded from the device outgoing message handler 152 through the queue 158 and then to the service processor 200 through bulk-in pipe 114. Importantly, although described as being transferred via the pipes 111, 112 and 114, it should be noted that the pipes are logical connections, and that the transfer of the information actually occurs via the USB 20.

In accordance with this aspect of the invention, and for the above described exchange to have taken place, the device outgoing message handler 152 will have received a message from one of several software modules on the SINC 100 (e.g., the new messages block 126, the firmware update routine 119 or the reset routine 118). The module initiating the message will have prepended a communication protocol header 355 to the data 360. The device outgoing message handler 152 will have then placed the communication protocol header 355 in queue 156 and placed the data 360 in queue 158. Although described using reset routine 118, firmware update routine 119 and new messages block 126, the message to be sent from the SINC device 100 can come from any of a number of different sources resident, and not shown, on the SINC device 100.

In accordance with an aspect of the invention, the device driver 251 will read from the interrupt-in pipe 112 by using a "read" call. The concept of a call is understood by those having ordinary skill in the art. The call will remain pending if there is no message in the interrupt-in pipe 112. The call will return if the USB host driver 224 detects a communication protocol header 355 in the interrupt-in pipe 112. The device driver 251 will then remove the communication protocol header 355 from the interrupt-in pipe 112 and if the communication protocol header 355 indicates that there is data 360 associated therewith, the device driver 251 will post a read call at the bulk-in pipe 114. This read call will remain pending until the read is completed.

OUTGOING MESSAGE OPERATION EXAMPLE

The transfer of an outgoing message (that is, a message sent from the service processor 200 to a remote device, such as SINC device 100) will now be described. A message to be processed by the service processor 200 will either originate at the service processor 200 or may originate in another device (such as SINC device 100) connected to the USB 20. In accordance with the invention, the USB router 218 will queue an outbound message in one of the queues 256, 257 or 258 associated with the device to which the message is addressed. In this example, the USB router 218 will pass the message to device driver 251, which will queue a message in queue 256 for eventual transmission to SINC device 100. If there are no messages currently in the process of being sent to SINC 100, the device driver 251 will immediately extract the message from queue 256 and send the message to the SINC device 100. If there is a previous outgoing message being sent, the new message will be retained in queue 256 and will be retrieved and sent to the SINC device 100 when a "send complete" interrupt for the earlier message occurs. The message sent from the USB router 218 through the bulk-out pipe 111 is then received into the device incoming message handler 151 and placed into queue 154. Using "function calls" as known in the art, the executive 101 periodically calls, or polls, via connection 109, the device incoming message hander 151 to determine whether there is a message present in queue 154. The executive 101 performs other function calls as well. For example, the executive 101 periodically calls the hardware interface 104 via connection 103 to determine the status of the hardware on the SINC device 100. The hardware interface 104 can also communicate with message logic 150 via connection 108 if it has any information to send to any other device connected on the USB 20. If the device incoming message handler 151 has any information in the queue 154, then upon being polled by the executive 101, the device incoming message handler 151 will generate the appropriate function call in order to execute the message that is present in queue 154.

For example, assuming that the firmware update module 211 has sent a firmware update message via the USB 20 to the SINC device 100, when the device incoming message handler 151 detects this message in queue 154, it will execute the appropriate function call via connection 117 to execute firmware update routine 119. This firmware update is shown for illustration purposes only. Other messages will invoke different routines. Alternatively, the device incoming message handler 151 may have received a reset command, in which case it will execute a function call via connection 116 to reset routine 118, which via connection 127, will send a reset command to the reset hardware 128.

There are a number of different scenarios in which the SINC device 100 will send a message to another device located on the USB 20 or to the service processor 200.

For example, upon execution of the firmware update routine 119 in response to the firmware update message received from firmware update module 211, the firmware update routine 119 could send either or both of an acknowledgement of the receipt of the message and a message indicating success or failure of the action requested in the message. This can be accomplished by the communication protocol header 355 to be described with respect to FIGS. 7 and 8. Alternatively, an unsolicited status update message can be sent from the SINC device 100 via new messages block 126. As another example, the new messages block 126 could send a message to the PM3 device 70, which is a power monitor, informing it of the SINC's power requirements.

Regardless of the manner in which a message is provided, the device outgoing message handler 152 will analyze the message, which includes the communication protocol header 355 and data 360, and will place the header 355 in queue 156 and place the data 360 in queue 158. In accordance with the invention, the communication protocol header 355 is prepended to the data 360 by whichever device sent the message. For example, if the firmware update routine 119 was instructed to reply to the message received from the firmware update module 211, the firmware update routine 119 would prepend the communication protocol header 355, in accordance with that to be described below, to the message and deliver the header and the message to the device outgoing message handler 152. The communication protocol header 355 prepended by the firmware update routine 119 identifies the service processor 200 as the destination for the message. When firmware update module 211 sent the message to which firmware update routine 119 is now responding, it would have put a unique number in the private area of the header (bytes 8–11 to be described below in FIG. 7). This unique number is opaque to firmware update routine 119, but is an identifier, which allows service processor incoming message handler 250 to identify firmware update module 211 as the intended recipient of the response message. When firmware update routine 119 built the response message, it would copy the private bytes 362, 364, 366 and 367 (FIG. 7) from the request message to the response message. The use of the private area of the message header is discussed below with respect to FIG. 7.

The device outgoing message handler 152 places the communication protocol header 355 into the interrupt-in pipe 112 corresponding to queue 156 and will place the data 360, if any is present, in the bulk-in pipe 114 associated with queue 158. The queue 156 is a double buffered queue, corresponding to the USB device controller 106, which is double buffered.

Figure 6:
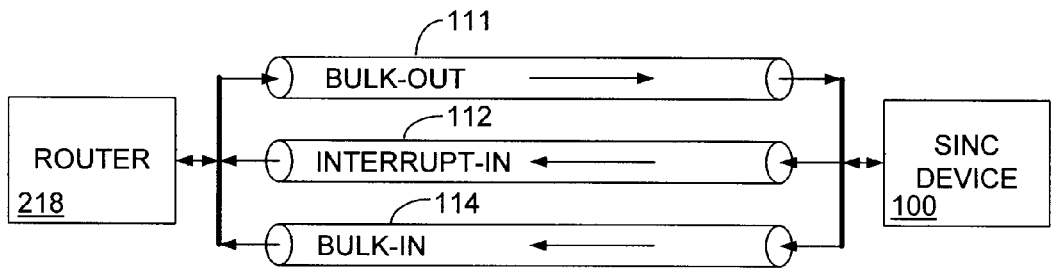
FIG. 6 is a diagrammatic view illustrating the pipes of FIG. 3 implemented as queues in FIG. 5.

FIG. 6 is a diagrammatic view illustrating the pipes of FIG. 3 implemented as queues in FIG. 5. As shown, router 218 and SINC device 100 are connected via bulk-out pipe 111, interrupt-in pipe 112 and bulk-in pipe 114. FIG. 6 illustrates the pipes as individual paths through which messages are exchanged. It should be noted that although shown as three individual pipes in FIG. 6, the pipes all exist on USB 20.

MESSAGE HEADER FORMAT

Figure 7:
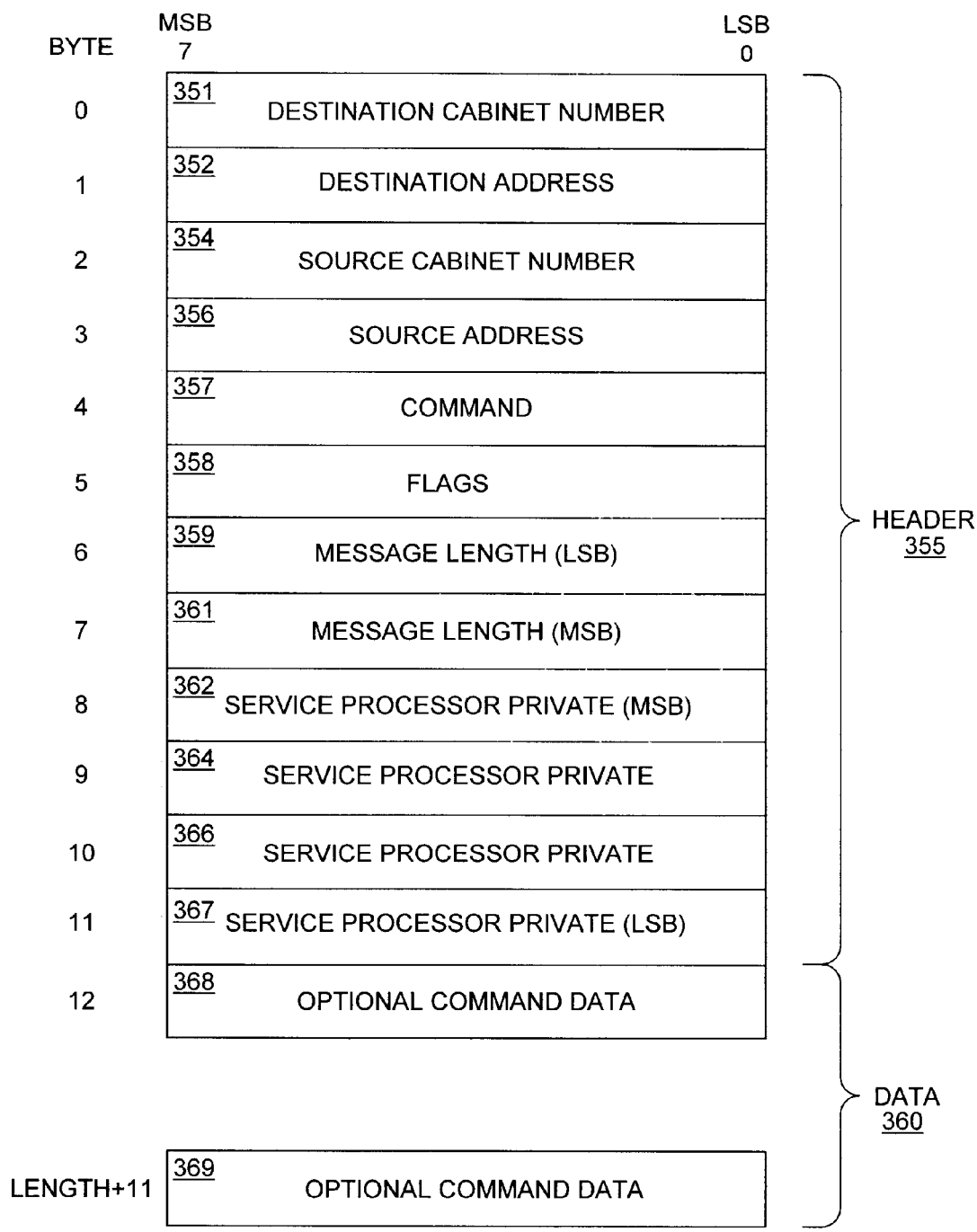
FIG. 7 is a schematic view illustrating an example of the communication message of the message format of FIG. 4.

FIG. 7 is a schematic view illustrating an example of the communication message 350 of the message format 330 of FIG. 4. Communication message 350 includes communication protocol header 355 and data 360. Communication protocol header 355 includes 12 bytes of information. The bytes need not necessarily occur in the order shown. The destination cabinet number 351 (byte 0) contains information regarding the destination cabinet number.

The destination address 352 (byte 1) is the address within a cabinet of the device to which the message is destined. The cabinet number, together with the destination address 352 (byte 1), identifies the device (i.e., the SINC device 100, CLU device 60 and PM3 device 70) by assigning a unique device number to each device connected to the USB 20.

Source cabinet number 354 (byte 2) is the source cabinet number (i.e., the number of the cabinet containing the device that originates the message) and the source address 356 (byte 3) is the address within a cabinet of the device sending the message). The destination address and the source address within a cabinet are shown below in Table 1.

TABLE 1

| Communication Protocol Device | Communication Protocol Address |
| --- | --- |
| SINC 0 | 0x00 |
| SINC 1 | 0x01 |
| SINC 2 | 0x02 |
| SINC 3 | 0x03 |
| SINC 4 | 0x04 |
| SINC 5 | 0x05 |
| SINC 6 | 0x06 |
| SINC 7 | 0x07 |
| PM3 | 0x10 |
| CLU | 0x20 |
| Service processor | 0x40 |
| Futures | 0x50–0xff |

The addresses given in Table 1 are arbitrary in that any unique values could be used. The fact that the name space is predefined means that devices cannot take on arbitrary names. There is preferably a predefined overall naming scheme by which a device can know its own name (address) and the name (address) of any device with which it may communicate. Alternatively, a directory service may take the place of such a naming scheme.

The command byte 357 (byte 4) instructs the receiving module how to handle the message. Some implementation specific examples of commands and values used in the preferred embodiment are given below.

| | |
|---|---|
| BusboyCmmdExecStatus | = 0x00, |
| BusboyCmmdUnsolicited Status | = 0x01,/* CLU/SINC/PM3/PDI to SUB */ |
| BusboyCmmdBootNormal | = 0x02,/* SUB to SINC   */ |
| BusboyCmmdBootType1 | = 0x03,/* SUB to SINC   */ |
| BusboyCmmdTocCell | = 0x04,/* SUB to SINC   */ |
| BusboyCmmdResetCell | = 0x05,/* SUB to SINC   */ |
| BusboyCmmdResetYourself | = 0x06,/* SUB to CLU/SINC/PM3/PDI */ |
| BusboyHdrIdIcmHdrResponse | = 0xf3,/* SINC to SUB   */ |

The command meanings and values are determined by the implementation details of a system constructed in accordance with the invention.

Flags byte 358 (byte 5) represents the flags, which will be described in greater detail below with respect to FIG. 8. Message length 359 (byte 6) represents the message length (least significant byte) and message length 361 (byte 7) represents the message length (most significant byte). The message length is the number of bytes in the message, including the 12 bytes of message header 355. An incoming message handler can determine whether there is a data portion 360 of a message 350 by checking whether the message length is greater than 12 bytes.

Bytes 8 362 through 11 367 represent private data which identifies the software module (firmware update module 211 in this example) that initiated a request which requires a response. Any module in a device (e.g. firmware update module 211 in service processor 200) which expects another device (e.g. SINC device 100) to respond to a message it sends places an identifier, thereby identifying itself, in the private area of the header in bytes 362, 364, 366, 367. The responding module in the responding device (e.g. firmware update routine 119 in SINC device 100) is required to copy the contents of the private area into the response message.

The identifier in the private area is a value, which the incoming message handler on the initiating device (e.g. service processor incoming message handler 250 on service processor 200) can recognize as the destination module for the response (e.g. firmware update module 211 response queue). The identifier could be, for example, the identifier of a response queue for, or the address of, a function to call in the module that sent the original request. The service processor incoming message handler 250 directs all responses to the specific module based on the contents of the private area (bytes 8 through 11 in header 355).

To illustrate addressing, the source and destination bytes 351, 352, 354, 356 shown in FIG. 7 identify the device. If the message is a command (initiated by a module), and if there is more than one command processing module on the destination device, the contents of the command byte 357 (byte 4) can identify the specific module within the device that is to process the given command. If a message is a response (initiated in response to a command previously received), the contents of the command byte 357 (byte 4), together with the contents of the private area bytes 362, 364, 366 and 367 (bytes 8–11), identify the specific module to which the response is to be passed. The contents of the command byte 357 (byte 4), together with the contents of the private area bytes 362, 364, 366 and 367 (bytes 8–11), can also enable a module which has multiple requests outstanding to different devices to tie the response from each back to the outstanding request.

Message format 350 also includes data 360, which includes optional command data bytes 368 and 369 (bytes 12 through byte length+11) of the message format 350. Optional command data includes optional data. Data 360 is a variable length field containing 0 or more bytes of data. This data pertains to the particular command in the command byte 357 (byte 4). For example, if the command was "Program EPROM Sector", the data portion of the packet would be the data to program into the EPROM sector. If the command was "Status Response" and the packet was being sent as a result of a previous "Status Query" message, the data portion would be the actual device status.

Figure 8:
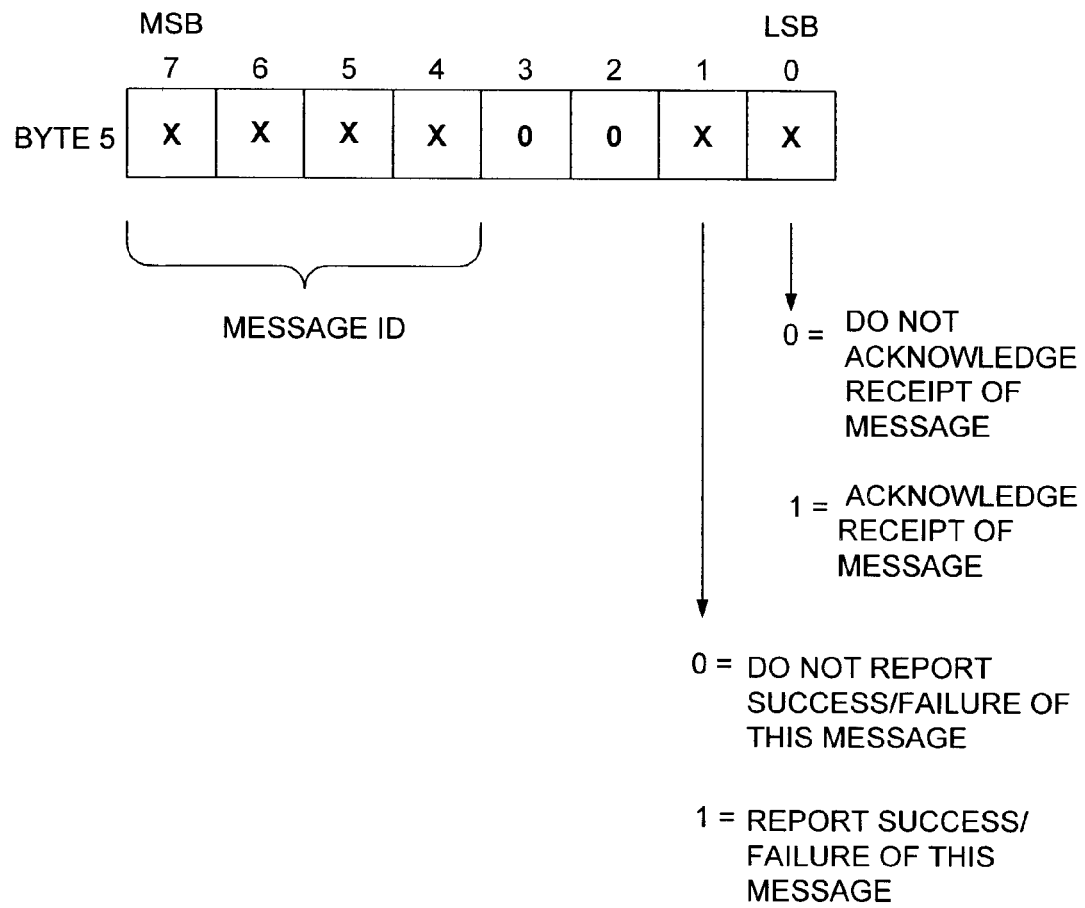
FIG. 8 is a schematic view illustrating the communication protocol flag byte of FIG. 7.

FIG. 8 is a schematic view illustrating the flag byte 358 (byte 5) of FIG. 7. As shown, flag byte 358 represents the flags format in which the bits 4–7 include message identification information and bits 0 and 1 can be set depending on the response desired from an individual device, such as SINC 100 connected to the USB 20. For example, if the least significant bit (LSB) 0 is set to a logic "0" it indicates that the SINC device 100 of FIG. 5 is not to acknowledge receipt of a message sent to it. If the LSB 0 is set to a logic "1" then it signifies that receipt of the message should be acknowledged by the receiving device (i.e., the SINC 100 in the example described above with respect to FIG. 5). Similarly, if the bit 1 of flag byte 358 (byte 5) is set to a logic "0", it indicates that success or failure of the command contained in the message need not be reported back to the originator of the message. Similarly, if the bit 1 is set to a logic "1", then the sending device is indicating that success or failure of the command contained in the message is to be reported back to the originating device.

INITIALIZATION

Referring back to FIG. 5, as part of standard USB initialization, the USB host driver 224 enumerates (assigns an address to) each device (i.e., SINC device 100, CLU device 60, etc.) as that device becomes connected to the bus. (Note that this is a physical layer address, which is different from the logical layer address shown in Table 1.) The device, at that time, returns a device descriptor to the host. The device descriptor identifies the device type. This is well known by those having ordinary skill in the art of USB communications. At this time, the device in the preferred embodiment reports that it is, for example, a PM3 70, a CLU 60 or a SINC 100. It also reports its specific address (e.g. SINC 100 in Cabinet 0, SINC number 2), using the encoding shown in Table 1. This allows the USB host driver 224 to initialize the appropriate queues (e.g. queue256, and pipes 112 and 114) for this particular device.

The address of the device given in Table 1 is synonymous with its name. It is possible to consider a scheme where the address of a given device type and number is not fixed, but assigned dynamically. Such a scheme may be desirable if the mix of device types needs to be more flexible. If such a system were designed, it should still have the concept of a "name" for a device, in order that other entities could address that device. However, in such a case, there would preferably be a directory service so that any device could obtain the address corresponding to a name. The concept of a directory service is well known to those skilled in the art of networking.

It will be apparent to those skilled in the art that many modifications and variations may be made to the preferred embodiments of the present invention, as set forth above, without departing substantially from the principles of the present invention. For example, the present invention can be used in any system in which a number of devices communicate over a USB. All such modifications and variations are intended to be included herein within the scope of the present invention, as defined in the claims that follow.

What is claimed is:

1. A method for using a universal serial bus (USB) as a peer-to-peer network, the method comprising the steps of:

connecting a host processor to a USB, said host processor including a router;

connecting a plurality of devices to said USB, each of said devices being peers with respect to each other and with respect to said host processor;

forming a message in one of said plurality of devices or said host processor;

prepending a header to said message; and transporting said message from one of said devices directly to any other of said devices or said host processor through said router and over said USB.

2. The method of claim 1, wherein said header further comprises a plurality of fields uniquely identifying each of said devices.

3. The method of claim 1, wherein each of said devices further includes logic configured to recognize said plurality of fields.

4. The method of claim 1, wherein said host processor further includes a first device driver associated with said router and each of said devices further includes a second device driver corresponding to said first device driver in said router, said first device driver and second device driver configured to establish a logical connection between said router and each of said devices.

5. The method of claim 4, wherein said logical connection includes an interrupt-in pipe, a bulk-in pipe and a bulk-out pipe.

6. The method of claim 5, further comprising the step of using a host controller in said host device to poll said interrupt-in pipe to determine whether any of said devices has any information to transfer to said router.

7. The method of claim 6, further comprising the step of transferring said information from said additional device to said router using said bulk-in pipe.

8. The method of claim 7, further comprising the step of analyzing said header associated with said information to determine whether said information is destined for said host device or another of said plurality of devices.

9. A system for using a universal serial bus (USB) as a peer-to-peer network, comprising:

a host processor including a host message handler, said host processor configured to prepend a header to a message, said host message handler configured to recognize said header;

a plurality of devices associated with said host processor, each of said devices including a device message handler, each of said plurality of devices configured to prepend said header to said message, said device message handler also configured to recognize said header; and a router associated with said host processor, said router configured to route said message over a universal serial bus (USB) directly between any of a plurality of said devices associated with said host processor and said host processor.

10. The system of claim 9, wherein said header further comprises a plurality of fields uniquely identifying each of said devices.

11. The system of claim 9, wherein said host processor further includes a first device driver associated with said router and each of said devices further includes a second device driver corresponding to said first device driver in said router, said first device driver and second device driver configured to establish a logical connection between said router and each of said devices.

12. The system of claim 11, wherein said logical connection includes an interrupt-in pipe, a bulk-in pipe and a bulk-out pipe.

13. The system of claim 12, wherein said device message handler further includes:

an incoming message handler configured to receive said message from said bulk-out pipe; and an outgoing message handler configured to place said header in said interrupt-in pipe and place data associated with said message in said bulk-in pipe.

14. A computer readable medium having a program for using a universal serial bus (USB) as a peer-to-peer network, the program including logic configured to perform the steps of:

connecting a host processor to a USB, said host processor including a router;

connecting a plurality of devices to said USB, each of said additional devices being peers with respect to each other and with respect to said host processor;

forming a message in one of said plurality of devices;

prepending a header to said message; and transporting said message from one of said devices directly to any other of said devices or said host processor through said router and over said USB.

15. The program of claim 14, wherein said header further comprises a plurality of fields uniquely identifying each of said devices.

16. The program of claim 14, wherein each of said devices further includes logic configured to recognize said plurality of fields.

17. The program of claim 14, wherein said host processor further includes a first device driver associated with said router and each of said devices further includes a second device driver corresponding to said first device driver in said router, said first device driver and second device driver configured to establish a logical connection between said router and each of said devices.

18. The program of claim 17, wherein said logical connection includes an interrupt-in pipe, a bulk-in pipe and a bulk-out pipe.

19. The program of claim 18, further comprising logic configured to perform the step of using a host controller in said host device to poll said interrupt-in pipe to determine whether any of said devices has any information to transfer to said router.

20. The program of claim 19, further comprising logic configured to perform the step of transferring said information from said additional device to said router using said bulk-in pipe.

21. The program of claim 20, further comprising logic configured to perform the step of analyzing said header associated with said information to determine whether said information is destined for said host device or another of said plurality of devices.

* * * * *